(12) United States Patent
Nguyen et al.

(10) Patent No.: US 11,410,276 B2
(45) Date of Patent: Aug. 9, 2022

(54) DETERMINATION OF AN OPERATION

(71) Applicant: Nokia Technologies Oy, Espoo (FI)

(72) Inventors: David Nguyen, Santa Clara, CA (US); Audrey Desjardins, Vancouver (CA)

(73) Assignee: NOKIA TECHNOLOGIES OY, Espoo (FI)

( * ) Notice: Subject to any disclaimer, the term of this patent is extended or adjusted under 35 U.S.C. 154(b) by 379 days.

(21) Appl. No.: 15/980,338

(22) Filed: May 15, 2018

(65) Prior Publication Data

US 2018/0260935 A1    Sep. 13, 2018

Related U.S. Application Data

(63) Continuation of application No. 14/915,733, filed as application No. PCT/US2014/055959 on Sep. 16, 2014, now Pat. No. 10,013,737.
(Continued)

(51) Int. Cl.
*G06T 3/60* (2006.01)
*G06F 3/0487* (2013.01)
(Continued)

(52) U.S. Cl.
CPC ........... *G06T 3/60* (2013.01); *G06F 1/163* (2013.01); *G06F 1/1626* (2013.01);
(Continued)

(58) Field of Classification Search
None
See application file for complete search history.

(56) References Cited

U.S. PATENT DOCUMENTS

| 6,115,025 A | 9/2000 | Buxton et al. |
| 8,209,635 B2 | 6/2012 | Thom |

(Continued)

FOREIGN PATENT DOCUMENTS

| CN | 101291352 A | 10/2008 |
| CN | 101387940 A | 3/2009 |

(Continued)

OTHER PUBLICATIONS

Office Action for Phillipines Patent Application No. 1-2016-500510 dated Apr. 2, 2019, 4 pages.
(Continued)

*Primary Examiner* — Nicholas J Lee
(74) *Attorney, Agent, or Firm* — Alston & Bird LLP

(57) ABSTRACT

A method comprising entering a passive viewing state of an apparatus, receiving information indicative of a first input, determining a first operation based, at least in part, on a passive viewing state and the first input, performing the first operation, receiving environmental sensor information, determining that the environmental sensor information indicates that the apparatus is actively viewed by a user, entering of an active viewing state of the apparatus based, at least in part, on the determination that the environmental sensor information indicates that the apparatus is actively viewed by the user, receiving information indicative of a second input, the second input being substantially the same as the first input, determining a second operation based, at least in part, on the active viewing state and the second input, the second operation being different from the first operation, and performing the second operation is disclosed.

20 Claims, 9 Drawing Sheets

Related U.S. Application Data

(60) Provisional application No. 61/879,063, filed on Sep. 17, 2013.

(51) Int. Cl.

| | |
|---|---|
| *G06F 1/16* | (2006.01) |
| *G06F 3/01* | (2006.01) |
| *G09G 5/30* | (2006.01) |
| *G06F 3/0482* | (2013.01) |
| *G06F 3/0346* | (2013.01) |
| *G06F 3/041* | (2006.01) |
| *G06F 3/0481* | (2022.01) |
| *G06F 3/04845* | (2022.01) |
| *G06F 3/14* | (2006.01) |
| *G09G 5/391* | (2006.01) |

(52) U.S. Cl.
CPC ......... *G06F 1/1637* (2013.01); *G06F 1/1684* (2013.01); *G06F 1/1694* (2013.01); *G06F 3/013* (2013.01); *G06F 3/017* (2013.01); *G06F 3/0346* (2013.01); *G06F 3/041* (2013.01); *G06F 3/0481* (2013.01); *G06F 3/0482* (2013.01); *G06F 3/0487* (2013.01); *G06F 3/04845* (2013.01); *G06F 3/14* (2013.01); *G09G 5/30* (2013.01); *G09G 5/391* (2013.01); *G06F 2200/1637* (2013.01); *G09G 2320/02* (2013.01); *G09G 2320/06* (2013.01); *G09G 2320/0626* (2013.01); *G09G 2340/14* (2013.01); *G09G 2354/00* (2013.01)

(56) References Cited

U.S. PATENT DOCUMENTS

| | | | |
|---|---|---|---|
| 8,289,162 | B2 | 10/2012 | Mooring et al. |
| 8,351,773 | B2 | 1/2013 | Nasiri et al. |
| 8,750,565 | B2 | 6/2014 | Wu |
| 9,318,143 | B2 | 4/2016 | Pai |
| 9,417,666 | B2 | 8/2016 | Abraham et al. |
| 9,582,851 | B2 | 2/2017 | Raman |
| 2002/0080132 | A1 | 6/2002 | Dai et al. |
| 2002/0158812 | A1 | 10/2002 | Pallakoff |
| 2004/0201595 | A1 | 10/2004 | Manchester |
| 2007/0004451 | A1 | 1/2007 | C. Anderson |
| 2007/0136064 | A1 | 6/2007 | Carroll |
| 2008/0045207 | A1 | 2/2008 | Ahn et al. |
| 2008/0221877 | A1 | 9/2008 | Sumita |
| 2008/0259094 | A1 | 10/2008 | Kim et al. |
| 2009/0007006 | A1* | 1/2009 | Liu .................... G06F 1/1694 715/784 |
| 2009/0066637 | A1 | 3/2009 | McCall |
| 2009/0164896 | A1 | 6/2009 | Thom |
| 2010/0064259 | A1 | 3/2010 | Alexanderovitc et al. |
| 2010/0079508 | A1 | 4/2010 | Hodge et al. |
| 2010/0088061 | A1 | 4/2010 | Horodezky et al. |
| 2010/0125816 | A1 | 5/2010 | Bezos |
| 2011/0074671 | A1 | 3/2011 | Shimosato et al. |
| 2011/0156869 | A1 | 6/2011 | Walt |
| 2011/0163955 | A1 | 7/2011 | Nasiri et al. |
| 2011/0316888 | A1 | 12/2011 | Sachs et al. |
| 2012/0038675 | A1 | 2/2012 | Johnson et al. |
| 2012/0233059 | A1 | 9/2012 | Buck |
| 2012/0235790 | A1 | 9/2012 | Zhao et al. |
| 2013/0002541 | A1 | 1/2013 | Kanehira |
| 2013/0033485 | A1 | 2/2013 | Kollin et al. |
| 2013/0042209 | A1 | 2/2013 | Leon et al. |
| 2013/0083025 | A1 | 4/2013 | Gibson et al. |
| 2013/0135196 | A1 | 5/2013 | Park et al. |
| 2013/0222236 | A1 | 8/2013 | Gardenfors et al. |
| 2013/0222271 | A1 | 8/2013 | Alberth et al. |
| 2013/0342569 | A1 | 12/2013 | Karkkainen et al. |
| 2014/0009499 | A1 | 1/2014 | Gardenfors et al. |
| 2014/0132508 | A1 | 5/2014 | Hodge et al. |
| 2014/0152559 | A1 | 6/2014 | Chen |
| 2014/0313119 | A1* | 10/2014 | Cho .................... G06F 3/013 345/156 |
| 2014/0361971 | A1* | 12/2014 | Sala .................... G06F 3/041 345/156 |
| 2014/0369525 | A1 | 12/2014 | Lin |
| 2015/0024678 | A1 | 1/2015 | Chang et al. |
| 2015/0042554 | A1 | 2/2015 | Chen et al. |
| 2015/0097773 | A1 | 4/2015 | Liao et al. |
| 2015/0116601 | A1 | 4/2015 | Wang et al. |
| 2016/0195925 | A1 | 7/2016 | Nguyen et al. |
| 2016/0217554 | A1 | 7/2016 | Nguyen et al. |

FOREIGN PATENT DOCUMENTS

| | | |
|---|---|---|
| CN | 102047318 A | 5/2011 |
| CN | 103135762 A | 6/2011 |
| CN | 102160017 A | 8/2011 |
| CN | 102239460 A | 11/2011 |
| CN | 102334326 A | 1/2012 |
| CN | 102376295 A | 3/2012 |
| CN | 102804258 A | 11/2012 |
| CN | 102821199 A | 12/2012 |
| CN | 102902503 A | 1/2013 |
| EP | 1143326 | 10/2001 |
| JP | 2005-348000 | 12/2005 |
| JP | 2006-155268 | 6/2006 |
| JP | 2006-243784 | 9/2006 |
| JP | 2006-320738 | 11/2006 |
| JP | 2008-011035 | 1/2008 |
| JP | 2008-217444 | 9/2008 |
| JP | 2011-510364 | 3/2011 |
| JP | 2012-509544 | 4/2012 |
| JP | 2013-114691 | 6/2013 |
| WO | WO 01/43473 | 6/2001 |
| WO | WO 2009/045279 | 4/2009 |
| WO | WO 2013/081598 | 6/2013 |
| WO | WO 2013/099128 | 7/2013 |
| WO | WO 2013/162564 A1 | 10/2013 |
| WO | WO 2014/1423 82 A1 | 9/2014 |

OTHER PUBLICATIONS

Office Action for Chinese Application No. 2014800510040 dated Sep. 19, 2018, 12 pages.
Examiner's Answer to Appeal Brief for U.S. Appl. No. 14/914,165 dated Aug. 27, 2018.
Office Action for U.S. Appl. No. 14/914,165 dated Dec. 18, 2018.
Office Action for Chinese Application No. 201480059542.4 dated Nov. 16, 2018, 6 pages.
Office Action for Saudi Arabian No. (1)516370712 dated Mar. 19, 2018, 8 pages.
Office Action for Australian Application No. 2014321416 dated Apr. 4, 2019, 3 pages.
"The SnackBox: A Handheld Near-Eye Display", Draft version, CHI, 2014, pp. 1-8.
Extended European Search Report for corresponding European Patent Application No. 14846378.9, dated Apr. 12, 2017, 9 pages.
Extended European Search Report received for corresponding European Patent Application No. 14845472.1, dated Apr. 12, 2017, 8 pages.
Gupta et al., "Gesture Pendant II", Research Paper, Oct. 1, 2006, pp. 1-5.
International Search Report and Written Opinion for Application No. PCT/US2014/055962 dated Dec. 31, 2014, 7 pages.
International Search Report and Written Opinion for corresponding Application No. PCT/US2014/055829, dated Jan. 13, 2015, 6 pages.
International Search Report and Written Opinion for corresponding Application No. PCT/US2014/055959 dated Dec. 22, 2014, 15 pages.
Lyons et al., "Loupe: A Handheld Near-Eye Display", Proceedings of the 27th annual ACM symposium on User interface software and technology, Oct. 5-8, 2014, pp. 351-354.
Notice of Allowance for U.S. Appl. No. 14/914,800 dated Dec. 6, 2017.

(56) References Cited

OTHER PUBLICATIONS

Office Action for Chinese Application No. 2014800510040 dated Jan. 23, 2018, 15 pages.
Office Action for Chinese Application No. 201480051152.2 dated Feb. 5, 2018, 10 pages.
Office Action for Chinese Application No. 201480059542.4 dated Mar. 16, 2018, 11 pages.
Office Action for Philippines Patent Application No. 1-2016-500510 dated Mar. 15, 2018, 3 pages.
Office Action for U.S. Appl. No. 14/914,165 dated Aug. 24, 2017, 21 pages.
Office Action for U.S. Appl. No. 14/914,165 dated Dec. 21, 2017.
Office Action for U.S. Appl. No. 14/914,800 dated Jan. 30, 2017, 9 pages.
Office Action for U.S. Appl. No. 14/914,800 dated Jul. 6, 2017, 13 pages.
Office Action for U.S. Appl. No. 14/915,733 dated Sep. 8, 2017, 8 pages.
Office Action from Japanese Patent Application No. 2016-543957, dated Oct. 17, 2017, 6 pages.
Office action received for corresponding Japanese Patent Application No. 2016-543957, dated Apr. 25, 2017, 4 pages of office action and 7 pages of translation available.
Office action received for corresponding Saudi Arab Patent Application No. 516370712, dated Oct. 4, 2016, 1 pages of office action and no pages of translation available.
Supplementary European Search Report for Application No. EP 14846714.5 dated Apr. 13, 2017, 8 pages.
Notice of Allowance for U.S. Appl. No. 14/915,733 dated May 22, 2018.
Office Action for Philippine Application No. 1/2016/500510 dated Jul. 15, 2019.
Office action received for Saudi Arabian Patent Application No. 516370712, dated Feb. 20, 2019.
Extended European Search Report for Application No. 19179804.0 dated Nov. 5, 2019.
Office Action for U.S. Appl. No. 14/914,165 dated May 17, 2019.
Notice of Acceptance for Australian Application No. 2014321416 dated Apr. 15, 2020, 3 pages.
Notice of Allowance for Chinese Application No. 201480051004.0 dated May 13, 2019, 4 pages.
Office Action for Chinese Application No. 201480051152.2 dated Aug. 13, 2018, 14 pages.
Rejection Decision for Chinese Application No. 201480051152.2 dated Feb. 12, 2019, 8 pages.
Office Action for Chinese Application No. 201480051152.2 dated Apr. 24, 2019, 15 pages.
Office Action for Chinese Application No. 201480051152.2 dated Jul. 15, 2019, 14 pages.
Notice of Allowance for Chinese Application No. 201480051152.2 dated Dec. 3, 2019, 4 pages.
Notice of Allowance for Chinese Application No. 201480059542.4 dated Jun. 11, 2019, 4 pages.
Notice of Allowance for Philippine Patent Application No. 1/2016/500510 dated Nov. 6, 2019, 2 pages.
Office Action for Philippines Application No. 1/2016/500524 dated Oct. 18, 2019, 6 pages.
Office Action for Philippines Application No. 1/2016/500524 dated Jun. 2, 2020, 3 pages.
Notice of Allowance for Philippines Application No. 1/2016/500524 dated Oct. 22, 2020, 3 pages.
Reconsideration Report by Examiner Before Appeal for Japanese Application No. 2016-543957 dated Mar. 29, 2018, 10 pages.
Decision on Appeal for Japanese Application No. 2016-543957 dated Dec. 4, 2018, 35 pages.
Office Action for European Application No. 14846714.5 dated Feb. 14, 2020, 6 pages.
Summons to Attend Oral Proceedings for European Application No. 14846714.5 dated Nov. 3, 2020, 9 pages.
Office Action for European Application No. 19179804.0 dated Nov. 9, 2021, 6 pages.
Notice of Allowance for U.S. Appl. No. 14/914,165 dated Aug. 1, 2019.
U.S. Appl. No. 14/914,165, filed Feb. 24, 2016, US-2016/0217554, Pending.
U.S. Appl. No. 14/914,800, filed Feb. 26, 2016, U.S. Pat. No. 9,947,080, Issued.
U.S. Appl. No. 14/915,733, filed Mar. 1, 2016, US-2016/0195925, Allowed.

\* cited by examiner

| Tilt input | | Active Viewing State | 512 | Operation | 522 |
|---|---|---|---|---|---|
| | 502 | Passive Viewing State | 532 | Operation | 542 |
| Rotation input | | Active Viewing State | 514 | Operation | 524 |
| | 504 | Passive Viewing State | 534 | Operation | 544 |
| Pan input | | Active Viewing State | 516 | Operation | 526 |
| | 506 | Passive Viewing State | 536 | Operation | 546 |

DETERMINATION OF AN OPERATION

CROSS-REFERENCE TO RELATED APPLICATIONS

This application is a continuation of U.S. application Ser. No. 14/915,733, filed Mar. 1, 2016, which is a national phase entry of International Application No. PCT/US2014/055959, filed Sep. 16, 2014, which claims priority to U.S. Provisional Application No. 61/879,063, filed Sep. 17, 2013, the entire contents of which are incorporated herein by reference.

TECHNICAL FIELD

The present application relates generally to determination of an operation.

BACKGROUND

In recent times, electronic apparatuses have become increasingly pervasive in our society. In many circumstances, a user may often view and/or interact with information displayed by an electronic apparatuses and/or electronic apparatus peripherals in performance of various activities, in various contexts, and/or the like. As such, it may be desirable to configure an apparatus such that a user of the apparatus may view and/or interact with information displayed by the apparatus in an easy and intuitive manner.

SUMMARY

Various aspects of examples of the invention are set out in the claims.

One or more embodiments may provide an apparatus, a computer readable medium, a non-transitory computer readable medium, a computer program product, and/or a method for entering a passive viewing state of an apparatus, receiving information indicative of a first input, determining a first operation based, at least in part, on a passive viewing state and the first input, performing the first operation, receiving environmental sensor information, determining that the environmental sensor information indicates that the apparatus is actively viewed by a user, entering of an active viewing state of the apparatus based, at least in part, on the determination that the environmental sensor information indicates that the apparatus is actively viewed by the user, receiving information indicative of a second input, the second input being substantially the same as the first input, determining a second operation based, at least in part, on the active viewing state and the second input, the second operation being different from the first operation, and performing the second operation.

One or more embodiments may provide an apparatus, a computer readable medium, a computer program product, and/or a non-transitory computer readable medium having means for entering a passive viewing state of an apparatus, means for receiving information indicative of a first input, means for determining a first operation based, at least in part, on a passive viewing state and the first input, means for performing the first operation, means for receiving environmental sensor information, means for determining that the environmental sensor information indicates that the apparatus is actively viewed by a user, means for entering of an active viewing state of the apparatus based, at least in part, on the determination that the environmental sensor information indicates that the apparatus is actively viewed by the user, means for receiving information indicative of a second input, the second input being substantially the same as the first input, means for determining a second operation based, at least in part, on the active viewing state and the second input, the second operation being different from the first operation, and means for performing the second operation.

In at least one example embodiment, the determination of the first operation comprises determination that the first operation correlates with the first input and the passive viewing state.

In at least one example embodiment, the determination of the second operation comprises determination that the second operation correlates with the second input and the active viewing state.

In at least one example embodiment, the passive viewing state is an operational state in which operations that correlate with inputs and the passive viewing state are tailored to an impaired-viewing display mode.

In at least one example embodiment, the first operation avoids interaction associated with information displayed in an unimpaired-viewing display mode.

In at least one example embodiment, the first operation is limited to interaction associated with information displayed in an impaired-viewing display mode.

In at least one example embodiment, first operation omits causation of display of information in an unimpaired viewing display mode.

In at least one example embodiment, the first operation is configured to provide limited user visual interaction associated with the impaired-viewing display mode In at least one example embodiment, the active viewing state is an operational state in which operations that correlate with inputs and the active viewing state are tailored to the unimpaired-viewing display mode.

In at least one example embodiment, the second operation avoids limited user visual interaction associated with the impaired-viewing display mode.

In at least one example embodiment, the second operation comprises interaction associated with information displayed in an unimpaired-viewing display mode.

In at least one example embodiment, the second operation comprises causation of display of information in an unimpaired-viewing display mode.

In at least one example embodiment, the second operation is configured to provide interaction associated with information displayed in an unimpaired-viewing display mode.

One or more example embodiments further perform receipt of different environmental sensor information, determination that the different environmental sensor information indicates that the apparatus is not actively viewed by the user, and entering of the passive viewing state of the apparatus based, at least in part, on the determination that the different environmental sensor information indicates that the apparatus is not actively viewed by the user.

One or more example embodiments further perform receipt of information indicative of a third input, determination of a third operation based, at least in part, on the active viewing state and the third input, performance of the third operation, receipt of other environmental sensor information, determination that the other environmental sensor information indicates that the apparatus is not actively viewed by the user, entering of the passive viewing state of the apparatus based, at least in part, on the determination that the other environmental sensor information indicates that the apparatus is not actively viewed by the user, receipt of information indicative of a fourth input, the fourth input being substantially the same as the third input, and preclusion of performance of an operation based, at least in part, on the passive viewing state and the fourth input.

In at least one example embodiment, the preclusion of performance of the operation comprises determination of absence of an operation that correlates with the passive viewing state and the fourth input.

In at least one example embodiment, the first operation comprises termination of display of a visual event notification.

In at least one example embodiment, the first input is a tap input.

In at least one example embodiment, the second operation comprises disablement of a lock mode.

In at least one example embodiment, the first operation comprises scrolling of a first visual information, and the second operation comprises scrolling of a second visual information such that the second visual information is scrolled at an reduced rate in proportion to the second input from the rate of the scrolling of the first visual information in proportion to the first input.

In at least one example embodiment, the first input is a tilt input and the second input is a tilt input.

In at least one example embodiment, the passive viewing state is an operational state in which information is caused to be displayed in conformance with an impaired-viewing display mode absent display of information in an unimpaired-viewing display mode.

In at least one example embodiment, the passive viewing state is characterized by a state in which the apparatus is configured in a manner that provides visual impairment compensation.

In at least one example embodiment, the active viewing state is characterized by a state in which the apparatus is configured in a manner that avoids visual impairment compensation.

In at least one example embodiment, the determination that the environmental sensor information indicates that the apparatus is actively viewed by a user comprises at least one of determination that an orientation of the apparatus indicates that the apparatus is actively viewed by the user, determination that an eye of the user is proximate to the display, or determination that the user is holding the apparatus.

In at least one example embodiment, the environmental sensor information comprises information indicative of a direction of gravity in relation to the apparatus, and the determination that the environmental sensor information indicates that the apparatus is actively viewed by the user comprises determination that an orientation of the apparatus indicates that the apparatus is actively viewed by the user based, at least in part, on the information indicative of the direction of gravity.

In at least one example embodiment, a direction of gravity that is substantially parallel to a surface of the display indicates that the apparatus is actively viewed by the user.

In at least one example embodiment, the direction of gravity is substantially parallel to the surface of the display in circumstances where the direction of gravity deviates from being exactly parallel to the surface of the display within a predetermined threshold angle.

In at least one example embodiment, the environmental sensor information comprises proximity sensor information that indicates proximity of the user in relation to the display, and the determination that the environmental sensor information indicates that the apparatus is actively viewed by a user comprises determination that an eye of the user is proximate to the display based, at least in part, on the proximity sensor information.

In at least one example embodiment, the proximity sensor information indicating an object being within a threshold distance from the display indicates proximity of the user.

In at least one example embodiment, the environmental sensor information comprises touch sensor information indicative of a user holding the apparatus, and the determination that the environmental sensor information indicates that the apparatus is actively viewed by a user comprises determination that the user is holding the apparatus based, at least in part, on the touch sensor information.

In at least one example embodiment, the determination that the environmental sensor information indicates that the apparatus is not actively viewed by a user comprises at least one of determination that an orientation of the apparatus indicates that the apparatus is not actively viewed by the user, determination that an eye of the user is distant to the display, or determination that the user is not holding the apparatus.

In at least one example embodiment, the environmental sensor information comprises information indicative of a direction of gravity in relation to the apparatus, and the determination that the environmental sensor information indicates that the apparatus is not actively viewed by the user comprises determination that an orientation of the apparatus indicates that the apparatus is not actively viewed by the user based, at least, in part, on the information indicative of the direction of gravity.

In at least one example embodiment, a direction of gravity substantially perpendicular to a surface of the display indicates that the apparatus is not actively viewed by the user.

In at least one example embodiment, the direction of gravity is substantially perpendicular to the surface of the display in circumstances where the direction of gravity deviates from being exactly perpendicular to the surface of the display within a predetermined threshold angle.

In at least one example embodiment, the environmental sensor information comprises proximity sensor information that indicates absence of the user proximate to the display, and the determination that the environmental sensor information indicates that the apparatus is not actively viewed by a user comprises determination that an eye of the user is distant to the display based, at least in part, on the proximity sensor information.

In at least one example embodiment, the proximity sensor information indicating an object being beyond a threshold distance from the display indicates absence of the user.

In at least one example embodiment, the environmental sensor information comprises touch sensor information indicative of a user not holding the apparatus, and the determination that the environmental sensor information indicates that the apparatus is not actively viewed by a user comprises determination that the user is not holding the apparatus based, at least in part, on the touch sensor information.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
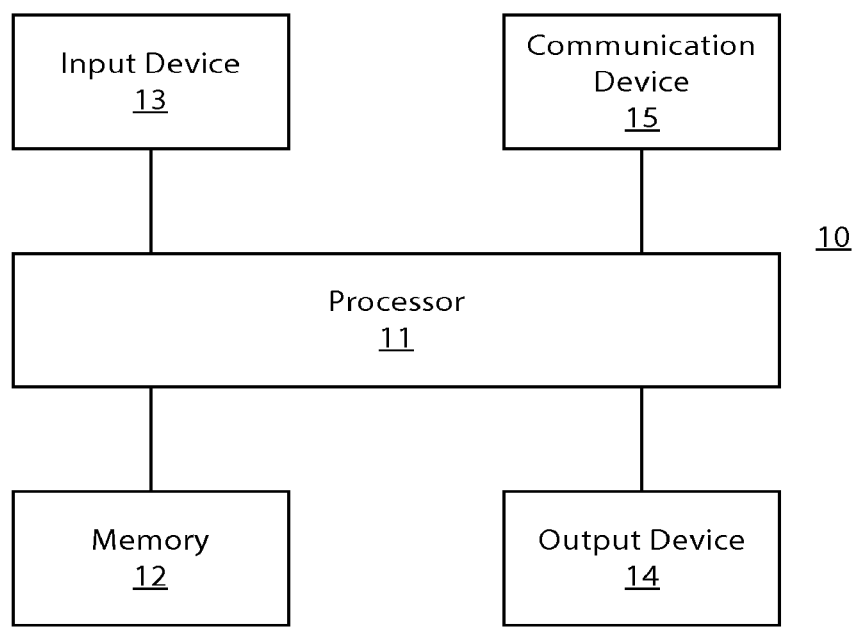
FIG. 1 is a block diagram showing an apparatus according to at least one example embodiment.

An embodiment of the invention and its potential advantages are understood by referring to FIGS. 1 through 8 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, a pendant apparatus, a bracelet apparatus, a watch apparatus, a wearable apparatus, a monocular apparatus, a binocular apparatus, a telescope apparatus, a stereoscopic image apparatus, a virtual reality apparatus, an augmented reality apparatus, a kaleidoscope apparatus, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition, or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display, or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

FIGS. 2A-2F are diagrams illustrating a pendant apparatus according to at least one example embodiment. The examples of FIGS. 2A-2F are merely examples and do not limit the scope of the claims. For example, size of the apparatus may vary, the shape of the apparatus may vary, the configuration of the apparatus may vary, and/or the like.

In some circumstances, it may be desirable to configure an electronic apparatus as a pendant apparatus. For example, configuration of an electronic apparatus as a pendant apparatus may permit a user of the electronic apparatus to easily transport the apparatus, wear the apparatus, interact with the apparatus, and/or the like. A pendant apparatus may refer to an electronic apparatus, such as an electronic apparatus similar as described regarding FIG. 1, comprising a pendant form factor. For example, an apparatus comprising a pendant form factor may comprise provisions for attaching the pendant apparatus to a necklace, easily handling the apparatus in the hand of a user, standing the apparatus upright on a table, and/or the like. In at least one example embodiment, a pendant apparatus comprises a necklace.

In some circumstances, it may be desirable for a pendant apparatus to comprise a display. For example, it may be desirable to display information to a user of the pendant apparatus. It may be desirable, in some circumstances, for a display comprised by a pendant apparatus to be a near eye display. For example, a near eye display may allow for the size of the apparatus to remain compact, allow for a user to view the display at a near distance with clarity, and/or the like. In at least one example embodiment, a pendant apparatus comprises a near eye display. In some circumstances, the pendant apparatus may be configured such that the near eye display is best viewed by a single eye of the user. In circumstances such as these, the pendant apparatus may be referred to as a monocular apparatus.

In some circumstances it may be desirable for a pendant apparatus to comprise multiple displays. For example, a pendant apparatus may be configured as a binocular apparatus. A binocular apparatus may refer to an electronic apparatus in which a first display is configured for viewing by a left eye of a user and a second display is configured for viewing by a right eye of a user, such that the displays may be viewed simultaneously by the user.

In some circumstances, it may be desirable for a pendant apparatus to receive environmental sensor information. For example, the apparatus may determine an apparatus orientation, a user input, an apparatus mode, and/or the like by receiving environmental sensor information from at least one environmental sensor. An environmental sensor may refer to an input device similar as described regarding FIG. 1. For example, an environmental sensor may be a touch sensor, an orientation sensor, an accelerometer sensor, an infrared sensor, an optical sensor, a proximity sensor, a gyro sensor, a magnetometer sensor, an inertial sensor, and/or the like.

Figure 2A:
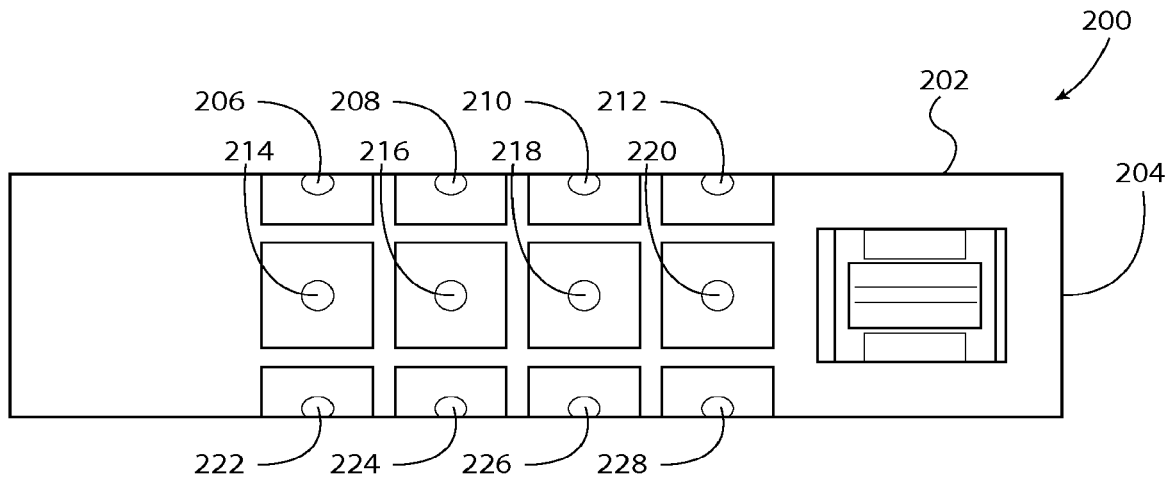
FIGS. 2A-2F are diagrams illustrating a pendant apparatus according to at least one example embodiment.
Figure 2B:
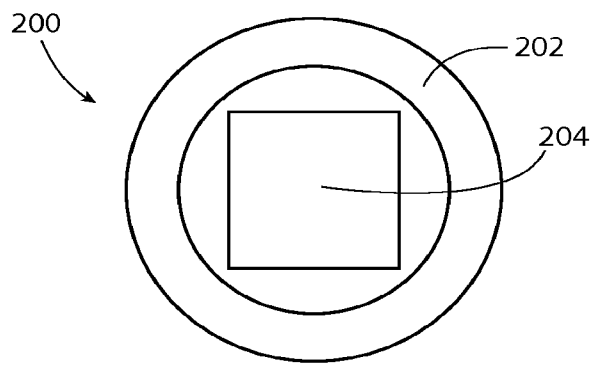
Figure 2C:
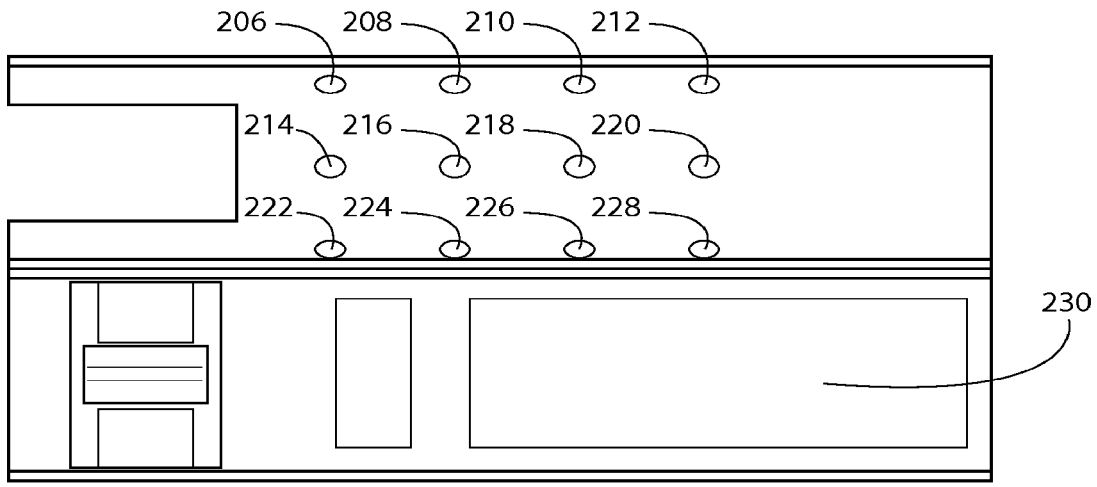

The examples of FIG. 2A-2C are diagrams illustrating apparatus 200 according to at least one example embodiment. FIG. 2A is a perspective view, FIG. 2B is a front view, and FIG. 2C is a cutaway view of the same example. In the example of FIGS. 2A-2C, apparatus 200 comprises enclosure 202, display 204, environmental sensors 206, 208, 210, 212, 214, 216, 218, 220, 222, 224, 226, and 228, and processor 230. The example of FIGS. 2A-2C depict apparatus 200 as a pendant apparatus, but it should be understood that apparatus 200 may be any type of electronic apparatus.

In some circumstances, a user may have an electronic apparatus similar as described regarding FIGS. 2A-2C under his control. In circumstances such as these, the apparatus may receive a notification of a message, a calendar alert, and/or the like. It may be desirable in circumstances such as these for the viewer to actively view the apparatus to perceive the notification, dismiss the alert, and/or the like. For example, the user may place the apparatus near his eyes, face the apparatus in his direction, and/or the like to actively view the apparatus. During active viewing of the apparatus, a user may be focusing his attention on the apparatus, interacting with the apparatus, and/or the like. For example, during an active viewing of the apparatus, a user may be actively reading information displayed on a display comprised by the apparatus.

Figure 2D:
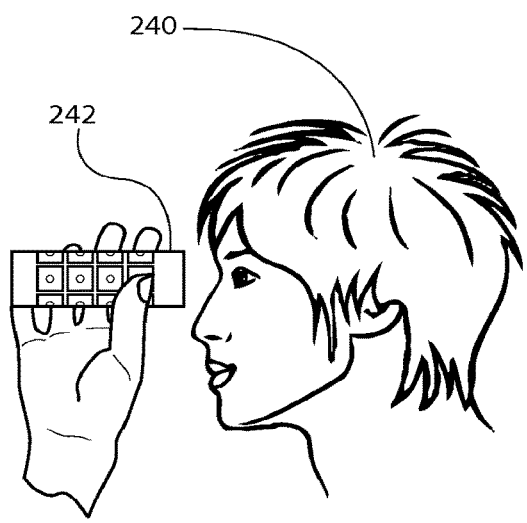

FIG. 2D is a diagram illustrating user 240 actively viewing a display comprised by apparatus 242. Even though the example of FIG. 2D depicts apparatus 242 as a pendant apparatus, apparatus 242 may be any type of electronic apparatus.

As previously described, in some circumstances, a user may have an electronic apparatus similar as described regarding FIGS. 2A-2C under his control. In some circumstances, an apparatus may be positioned such that the apparatus may not be actively viewed by the user. For example, the apparatus may be placed on a desk, placed in the user's pocket, worn on the user's body, and/or the like. In circumstances such as these, a display comprised by an apparatus may be passively viewed by a user of the apparatus. During passive viewing of the apparatus, a user may be focusing his attention on something other than the apparatus, ignoring the apparatus, viewing the apparatus with his peripheral vision, viewing the apparatus from a distance, and/or the like. For example, during passive viewing of the apparatus, a user may be reading information displayed on a display comprised by a different apparatus, performing a task independent of the apparatus, and/or the like. In this manner, an apparatus that is being passively viewed is not being actively viewed.

Figure 2E:
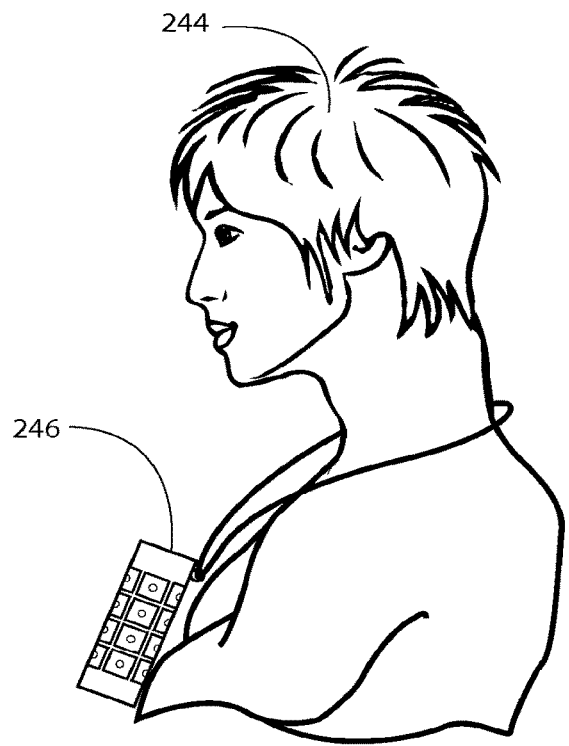

FIG. 2E is a diagram illustrating user 244 passively viewing a display comprised by apparatus 246. Even though the example of FIG. 2E depicts apparatus 244 as a pendant apparatus, apparatus 244 may be any type of electronic apparatus. It can be seen that apparatus 246 is attached to a necklace worn by user 244. Even though the example of FIG. 2E depicts apparatus 246 as being worn by user 244, apparatus 246 may be attached to user 244's clothing, carried in a pocket, carried in user 244's hand, and/or the like, such that apparatus 246 may be passively viewed by user 244.

Figure 2F:
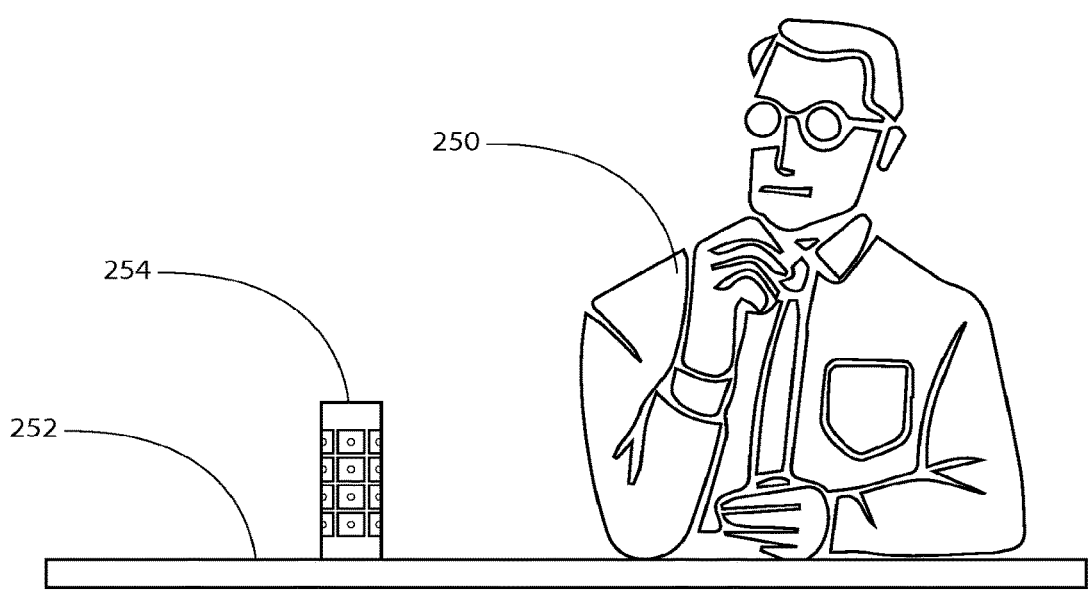

FIG. 2F is a diagram illustrating user 250 sitting at desk 252 passively viewing a display comprised by apparatus 254. Even though the example of FIG. 2F depicts apparatus 254 as a pendant apparatus, apparatus 254 may be any type of electronic apparatus. It can be seen that apparatus 254 is positioned upright on the top surface of desk 252. Even though the example of FIG. 2E depicts apparatus as upright on the top surface of desk 252, apparatus 254 may positioned in other positions such that apparatus 254 may be passively viewed by user 250. For example, apparatus 254 may be placed upright on a floor surface, laying on a side of apparatus 254 on top of a surface of desk 252, and/or the like.

As previously described, a user may be actively viewing an apparatus. For example, the user may be interacting with the apparatus in a manner similar to user 240 of FIG. 2D interacting with apparatus 242. In circumstances such as these, it may be desirable for an apparatus to enter an active viewing state of the apparatus. For example, an apparatus may determine that the apparatus is being actively viewed by a user based, at least in part, on the active viewing state of the apparatus. An active viewing state may be characterized by a state in which the apparatus is configured in a manner that avoids visual impairment compensation. Visual impairment compensation may refer to the rendering of visual information in a manner that it is easier to perceive and/or comprehend when viewing conditions are less than ideal. For example, visual information rendered with visual impairment compensation may be rendered with a lower pixel resolution, with a higher brightness level, without textual information, and/or the like. Alternatively, visual information rendered without visual impairment compensation may be rendered with an increased pixel resolution, with a lower brightness level, with textual information, and/or the like.

As previously described, a user may be passively viewing an apparatus, not viewing an apparatus, and/or the like. For example, the apparatus may be passively viewed similar as described regarding FIGS. 2E-2F. In circumstances such as these, the user may transition from passive to active viewing. For example, a user may move the apparatus from a position similar as depicted in FIG. 2E or 2F to a position similar as depicted in FIG. 2D. In circumstances such as these, it may be desirable for an apparatus to enter an active viewing state of the apparatus, based, at least in part, on environmental sensor information. For instance, environmental sensor information may indicate that the apparatus is actively viewed by a user. For example, environmental sensor information may indicate that the apparatus has an apparatus orientation with respect to a user. In such an example, the apparatus orientation may be similar to the orientation of apparatus 242 of FIG. 2D with respect to user 240. In at least one example embodiment, the apparatus enters an active viewing state of the apparatus based, at least in part, on the determination that the environmental sensor information indicates that the apparatus is actively viewed by the user.

In some circumstances, an orientation of the apparatus may indicate that the apparatus is actively viewed by the user. For example, the apparatus may be oriented such that a display comprised by the apparatus is in a position in which the view is unobscured. For instance, the orientation of the apparatus when being actively viewed may be similar to the orientation of apparatus 242 of FIG. 2D. In circumstances such as these, it may be desirable for environmental sensor information to indicate that the apparatus is actively viewed by the user based, at least in part, on the orientation of the apparatus. In at least one example embodiment, determination that the environmental sensor information indicates that the apparatus is actively viewed by a user comprises determination that an orientation of the apparatus indicates that the apparatus is actively viewed by the user. In some circumstances, the direction of gravity in relation to an apparatus may indicate may indicate that apparatus is actively viewed by a user. For example, the apparatus may be actively viewed if the direction of gravity substantially parallel to a surface of a display comprised by the apparatus. For instance, it can be seen that the direction of gravity in FIG. 2D is substantially parallel to the display of apparatus 242. In at least one example embodiment, environmental sensor information comprises information indicative of a direction of gravity in relation to the apparatus. In at least one example embodiment, the direction of gravity is substantially parallel to the surface of the display in circumstances where the direction of gravity deviates from being exactly parallel to the surface of the display within a predetermined threshold angle. In at least one example embodiment, the threshold angle is a predetermined angle, such as 15 degrees, 28 degrees, 45 degrees, and/or the like. In at least one example embodiment, the threshold angle varies based on one or more physical characteristics of the apparatus, such as the size of the apparatus, resolution of the display, obscurance of the display by a housing of the apparatus, and/or the like. In at least one example embodiment, the threshold angle may be based, at least in part, on other environmental circumstances, such as the distance between the apparatus and the user, contact between the user and the apparatus, and/or the like. For example, the threshold angle may be larger when the user is further from the apparatus, when the apparatus is larger in size, and/or the like. In another example, the threshold angle may be smaller when the user is closer to the apparatus, when the apparatus is smaller in size, and/or the like.

In some circumstances, an eye of a user proximate to a display comprised by an apparatus may indicate that the apparatus is actively viewed by the user. For example, the display may be a near eye display. A user actively viewing a near eye display may have their eye proximate to the display in a similar manner to user 240's eye being proximate to apparatus 242 of FIG. 2D. In circumstances such as these, it may be desirable for environmental sensor information to indicate that the apparatus is actively viewed by the user based, at least in part, a determination that an eye of the user is proximate to the display. For example, the environmental sensor may be a proximity sensor, an infrared sensor, a sonar, a radar, a capacitive sensor, a light sensor, and/or the like, comprised by the apparatus. In at least one example embodiment, determination that the environmental sensor information indicates that the apparatus is actively viewed by a user comprises determination that an eye of the user is proximate to the display. In at least one example embodiment, the environmental sensor information comprises proximity sensor information that indicates proximity of the user in relation to the display. In at least one example embodiment, the proximity sensor information indicates proximity of the user in circumstances where the proximity sensor information indicates an object being within a threshold distance from the display. In at least one example embodiment, the threshold distance is a predetermined distance, such as 2 centimeters, 4 centimeters, 8 centimeters, and/or the like In at least one example embodiment, the threshold distance varies based on one or more physical characteristics of the apparatus, such as the size of the apparatus, resolution of the display, obscurance of the display by a housing of the apparatus, and/or the like. In at least one example embodiment, the threshold distance may be based, at least in part, on other environmental circumstances, such as the distance between the apparatus and the user, contact between the user and the apparatus, and/or the like. For example, the threshold distance may be larger when the user is further from the apparatus, when the apparatus is larger in size, and/or the like. In another example, the threshold distance may be smaller when the user is closer to the apparatus, when the apparatus is smaller in size, and/or the like.

In some circumstances, a user holding an apparatus may indicate that the apparatus is actively viewed by the user. For example, a user may necessarily hold an apparatus while interacting with software associated with the apparatus. For instance, the apparatus may comprise touch sensors as an input for software control. A user actively viewing an apparatus may hold the apparatus in a similar manner to user 240 holding apparatus 242 of FIG. 2D. In circumstances such as these, it may be desirable for environmental sensor information to indicate that the apparatus is actively viewed by the user based, at least in part, on determination that the user is holding the apparatus. In at least one example embodiment, determination that the environmental sensor information indicates that the apparatus is actively viewed by a user comprises determination that the user is holding the apparatus. In at least one example embodiment, the environmental sensor information comprises touch sensor information indicative of a user holding the apparatus.

In some circumstances, it may be desirable to determine that an apparatus is actively viewed by a user based, at least in part, on a combination of environmental sensor information received from different environmental sensors. For instance, environmental sensor information may indicate that the apparatus is being actively viewed when no active viewing is occurring. For example, a user may briefly hold an apparatus to move it out of his way, or the apparatus may have an orientation consistent with viewing of the apparatus even though the apparatus is not being actively viewed. In circumstances such as these, the apparatus may determine that an apparatus is actively viewed by a user if a combination of environmental sensor information received from different environmental sensors is consistent with being actively viewed by a user. For example, the apparatus may determine that it is being actively viewed if it has a particular orientation and is simultaneously being held, if the apparatus is being held and the apparatus is proximate to the eye of the user, and/or the like.

As previously described, a user may be passively viewing an apparatus, not viewing an apparatus, and/or the like. For example, the apparatus may be passively viewed similar as described regarding FIGS. 2E-2F. In circumstances such as these, it may be desirable for an apparatus to enter a passive viewing state of the apparatus. For example, an apparatus may determine that the apparatus is not being actively viewed by a user based, at least in part, on the passive viewing state of the apparatus. A passive viewing state may be an operational state in which information is caused to be displayed in conformance with an impaired-viewing display mode absent display of information in an unimpaired-viewing display mode. A passive viewing state may be characterized by a state in which the apparatus is configured in a manner that provides visual impairment compensation.

As previously described, a user may be actively viewing an apparatus. For example, the user may be interacting with the apparatus in a manner similar to user 240 of FIG. 2D interacting with apparatus 242. In circumstances such as these, the user may transition from active to passive viewing. For example, a user may move the apparatus from a position similar as depicted in FIG. 2D to a position similar as depicted in FIG. 2E or 2F. In circumstances such as these, it may be desirable for an apparatus to enter a passive viewing state of the apparatus, based, at least in part, on environmental sensor information. For instance, environmental sensor information may indicate that the apparatus is not actively viewed by a user. For example, environmental sensor information may indicate that the apparatus has an apparatus orientation with respect to a user similar to the orientation of apparatus 246 of FIG. 2E with respect to user 244, similar to the orientation of apparatus 254 of FIG. 2F with respect to user 250, and/or the like. In at least one example embodiment, the apparatus enters a passive viewing state of the apparatus based, at least in part, on the determination that the environmental sensor information indicates that the apparatus is not actively viewed by the user.

In some circumstances, an orientation of the apparatus may indicate that the apparatus is not actively viewed by the user. For example, the apparatus may be oriented such that a display comprised by the apparatus is in a position in which the view is obscured. For instance, the orientation of the apparatus when being actively viewed may be similar to the orientation of apparatus 246 of FIG. 2E. In circumstances such as these, it may be desirable for environmental sensor information to indicate that the apparatus is not actively viewed by the user based, at least in part, on the orientation of the apparatus. In at least one example embodiment, determination that the environmental sensor information indicates that the apparatus is not actively viewed by a user comprises determination that an orientation of the apparatus indicates that the apparatus is not actively viewed by the user. In at least one example embodiment, the environmental sensor is a magnetometer, and environmental sensor information is indicative of an orientation of the apparatus relative to the magnetic north pole of the Earth. In some circumstances, the direction of gravity in relation to an apparatus may indicate may indicate that apparatus is not actively viewed by a user. For example, the apparatus may not be actively viewed if the direction of gravity substantially perpendicular to a surface of a display comprised by the apparatus. For instance, it can be seen that the direction of gravity in FIG. 2E is substantially perpendicular to the display of apparatus 246, and that the direction of gravity in FIG. 2F is substantially perpendicular to the display of apparatus 254. In at least one example embodiment, the direction of gravity is substantially perpendicular to the surface of the display in circumstances where the direction of gravity deviates from being exactly perpendicular to the surface of the display within a predetermined threshold angle. In at least one example embodiment, the threshold angle may be a predetermined angle, such as 15 degrees, 20 degrees, 45 degrees, and/or the like. In at least one example embodiment, the threshold angle varies based on one or more physical characteristics of the apparatus, such as the size of the apparatus, resolution of the display, obscurance of the display by a housing of the apparatus, and/or the like. In at least one example embodiment, the threshold angle may be based, at least in part, on other environmental circumstances, such as the distance between the apparatus and the user, contact between the user and the apparatus, and/or the like. For example, the threshold angle may be larger when the user is further from the apparatus, when the apparatus is larger in size, and/or the like. In another example, the threshold angle may be smaller when the user is closer to the apparatus, when the apparatus is smaller in size, and/or the like.

In some circumstances, absences of an eye of a user proximate to a display comprised by an apparatus may indicate that the apparatus is not actively viewed by the user. For example, the display may be a near eye display. A user not actively viewing a near eye display may have their eye distant to the display in a similar manner to user 244's eye being distant to apparatus 246 of FIG. 2E, user 250's eye being distant to apparatus 254 of FIG. 2F, and/or the like. In circumstances such as these, it may be desirable for environmental sensor information to indicate that the apparatus is not actively viewed by the user based, at least in part, a determination that an eye of the user is distant to the display. For example, the environmental sensor may be a proximity sensor, an infrared sensor, a sonar, a radar, a capacitive sensor, a light sensor, and/or the like comprised by the apparatus. In at least one example embodiment, determination that the environmental sensor information indicates that the apparatus is not actively viewed by a user comprises determination that an eye of the user is distant to the display. In at least one example embodiment, the proximity sensor information indicates distance from the user in circumstances where the proximity sensor information indicates an object being beyond a threshold distance from the display. In at least one example embodiment, the threshold distance is a predetermined distance, such as 20 centimeters, 30 centimeters, 50 centimeters, and/or the like. In at least one example embodiment, the threshold distance varies based on one or more physical characteristics of the apparatus, such as the size of the apparatus, resolution of the display, obscurance of the display by a housing of the apparatus, and/or the like. In at least one example embodiment, the threshold distance may be based, at least in part, on other environmental circumstances, such as the distance between the apparatus and the user, contact between the user and the apparatus, and/or the like. For example, the threshold distance may be larger when the user is further from the apparatus, when the apparatus is larger in size, and/or the like. In another example, the threshold distance may be smaller when the user is closer to the apparatus, when the apparatus is smaller in size, and/or the like.

In some circumstances, absence of a user holding an apparatus may indicate that the apparatus is not actively viewed by the user. For example, it may be necessary for a user to hold an apparatus to interact with software associated with the apparatus. For instance, the apparatus may comprise touch sensors as an input for software control. A user that is not actively viewing an apparatus may not be holding the apparatus in a similar manner to user 244 not holding apparatus 246 of FIG. 2E, user 250 not holding apparatus 254 of FIG. 2F, and/or the like. In circumstances such as these, it may be desirable for environmental sensor information to indicate that the apparatus is not actively viewed by the user based, at least in part, on determination that the user is not holding the apparatus. In at least one example embodiment, determination that the environmental sensor information indicates that the apparatus is not actively viewed by a user comprises determination that the user is not holding the apparatus. In at least one example embodiment, the environmental sensor information comprises touch sensor information indicative of a user not holding the apparatus.

In some circumstances, it may be desirable to determine that an apparatus is not actively viewed by a user based, at least in part, on a combination of environmental sensor information received from different environmental sensors. For instance, environmental sensor information may indicate that the apparatus is not being actively viewed when active viewing is occurring. For example, a user may briefly pull the apparatus away from his eye, the apparatus may have an orientation inconsistent with viewing of the apparatus even though the apparatus is being actively viewed, and/or the like. In circumstances such as these, the apparatus may determine that an apparatus is not actively viewed by a user if a combination of environmental sensor information received from different environmental sensors is consistent with not being actively viewed by a user. For example, the apparatus may determine that it is not being actively viewed if it has a particular orientation and is simultaneously not being held, if the apparatus is not being held and the apparatus is distant from the eye of the user, and/or the like.

Figure 3A:
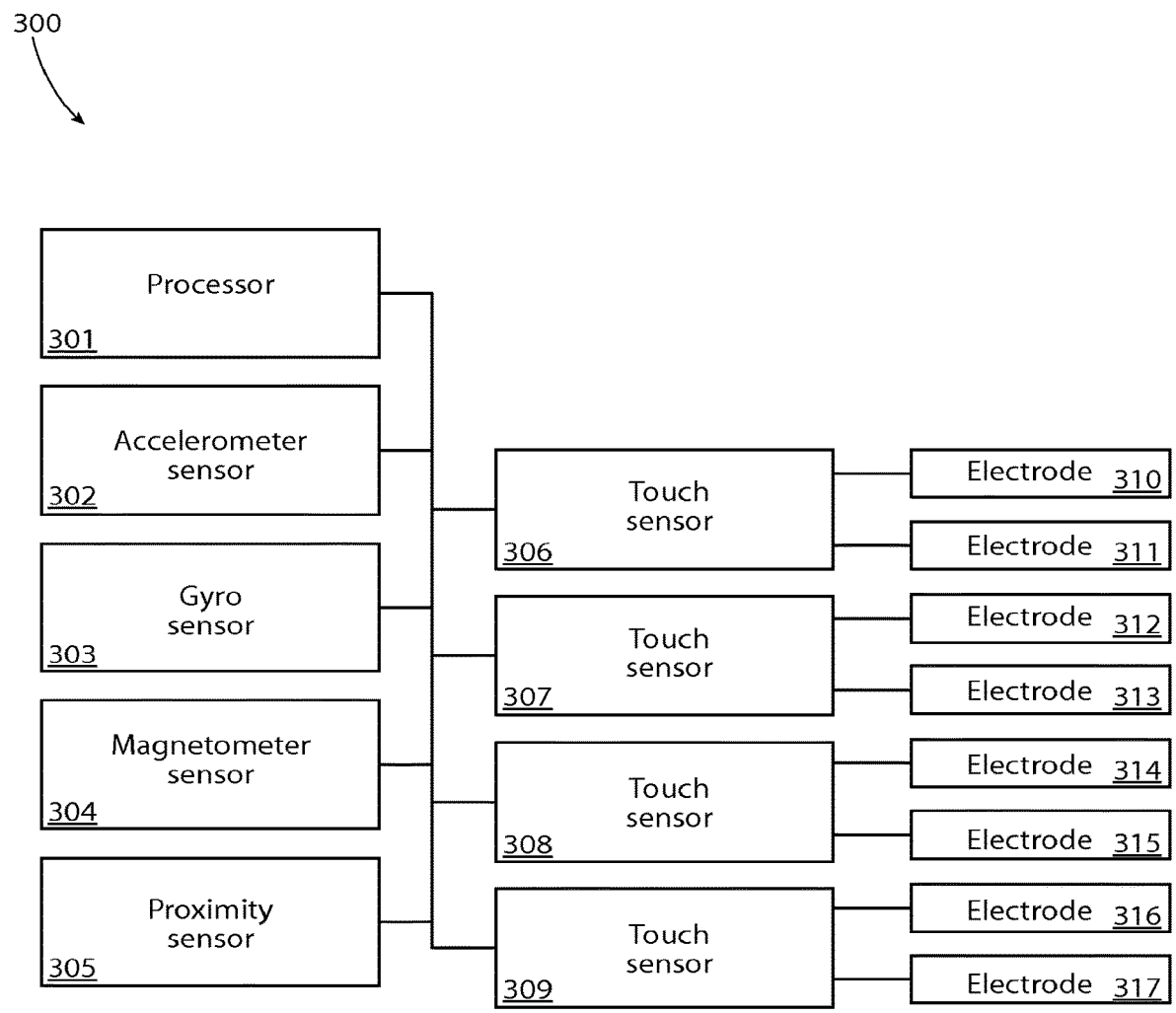
FIGS. 3A-3C are diagrams illustrating input according to at least one example embodiment.
Figure 3B:
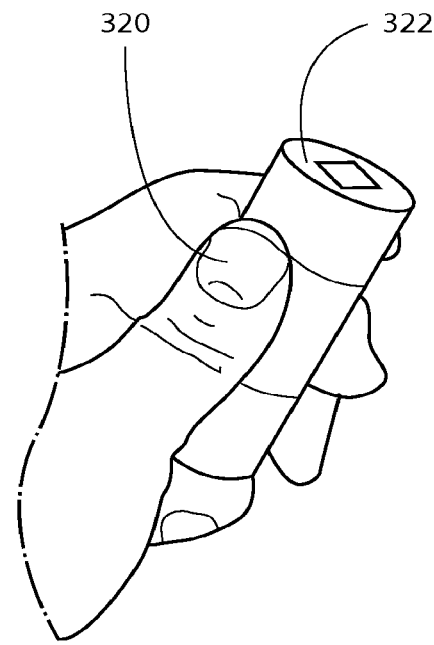
Figure 3C:
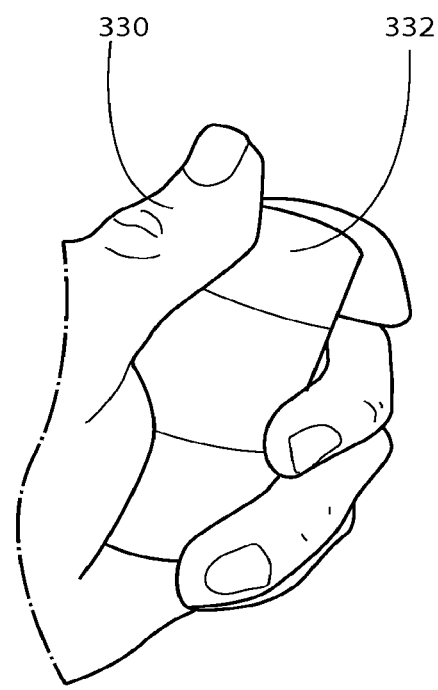

FIGS. 3A-3C are diagrams illustrating receipt of input according to at least one example embodiment. The examples of FIGS. 3A-3C are merely examples and do not limit the scope of the claims. For example, the type of input may vary, the number of inputs may vary, the apparatus receiving the input may vary, and/or the like.

As previously described, an apparatus may receive information indicative of an input. For example, the apparatus may receive information indicative of an input from one or more sensors. In circumstances such as these, it may be desirable for the apparatus to comprise the input sensors. For example, a user may perform physical manipulations of an apparatus comprising input sensors to interact with software controlled by the apparatus. In at least one example embodiment, an input sensor may be an environmental sensor. For example, an input sensor may be an environmental sensor similar as described regarding FIGS. 2A-2F.

FIG. 3A is a block diagram illustrating apparatus 300. In the example of FIG. 3A, apparatus 300 comprises processor 301, accelerometer sensor 302, gyro sensor 303, magnetometer sensor 304, proximity sensor 305, touch sensors 306-309, and electrodes 310-317. In the example of FIG. 3A, apparatus 300 may be an apparatus similar to the apparatus described regarding FIG. 1 and FIGS. 2A-2F. It should be understood that in the example of FIG. 3A, processor 301 may receive information indicative of an input from accelerometer sensor 302, gyro sensor 303, magnetometer sensor 304, proximity sensor 305, touch sensors 306-309, and/or the like. As can be seen in the example of FIG. 3A, each touch sensor may receive information indicative of a touch input from one or more electrodes. For example, touch sensor 306 may receive information indicative of a touch input from electrode 310 and/or electrode 311, touch sensor 307 may receive information indicative of a touch input from electrode 312 and/or electrode 313, touch sensor 308 may receive information indicative of a touch input from electrode 314 and/or electrode 315, and touch sensor 309 may receive information indicative of a touch input from electrode 316 and/or electrode 317. Although the example of FIG. 3A depicts each touch sensor being associated with two electrodes, each touch sensor may be associated with any number of electrodes.

In at least one example embodiment, information indicative of an input comprises information indicative of a touch input. In such an example, an apparatus, such as apparatus 300 of FIG. 3A, may detect a user touching the apparatus by way of a touch sensor, such as a user touching one or more of electrodes 306-317 of apparatus 300. Information indicative of a touch input may comprise information indicative of a contact area of the apparatus. For example, electrodes may be positioned at various points on the apparatus. For instance, the electrodes may be placed at various positions on the apparatus similar as described regarding the positions of environmental sensors 206, 208, 210, 212, 214, 216, 218, 220, 222, 224, 226, and 228 of apparatus 200 in the examples of FIGS. 2A-2C. In this manner, the apparatus may determine a contact area of the apparatus based, at least in part, on a contact area of the apparatus pinched or grasped by the user.

FIG. 3B is a diagram illustrating apparatus 322 grasped by user 320. Apparatus 322 may be similar as described regarding FIG. 1, FIGS. 2A-2F, FIG. 3A, and/or the like. FIG. 3C is a diagram illustrating apparatus 332 grasped by user 330. Apparatus 332 may be similar as described regarding FIG. 1, FIGS. 2A-2F, FIG. 3A, and/or the like.

In some circumstances, it may be desirable to provide various manners in which a user may interact with the apparatus by way of a touch input. For example, a user may use a particular touch input to make a particular indication to the apparatus, such as an affirmative response to a prompt, and the user may use a different touch input to make a different indication to the apparatus, such as a negative response to a prompt. For instance, a user may enter a pinch input to designate an affirmative response and a tap input to designate a negative response. Such touch inputs may be natural and intuitive to a user given the shape of the apparatus, the manner in which the user may hold the apparatus during use, and/or the like. In at least one example embodiment, information indicative of a touch input comprises information indicative of a pinch input. In such an example, an apparatus may be pinched by a user similar to user 320 pinching apparatus 322 in the example of FIG. 3B. In this manner, the apparatus may determine that the pinching of the apparatus by the user is a pinch input. In at least one example embodiment, information indicative of a touch input comprises information indicative of a grasp input. In such an example, an apparatus may be grasped by a user similar to user 330 grasping apparatus 332 in the example of FIG. 3B. In this manner, the apparatus may determine that the grasping of the apparatus by the user is a grasp input. In at least one example embodiment, information indicative of a touch input comprises information indicative of a tap input. In at least on example embodiment, a tap input refers to touching a touch sensor for a period below a threshold amount of time. For example, in some circumstances, the apparatus may detect a touch input received by a touch sensor for less than one second as a tap input. In other circumstances, the apparatus may detect a touch input received by a touch sensor for longer than one second as an input other than a tap input. In at least one example embodiment, a tap input refers to a physical disturbance of an apparatus that is detectable by an input sensor. For example, apparatus 320 of FIG. 3B may detect a user bumping apparatus 320 against his palm. Such a bumping of the palm may be detected by an input sensor, for example an accelerometer sensor, as a tap input.

Figures 4, 5:
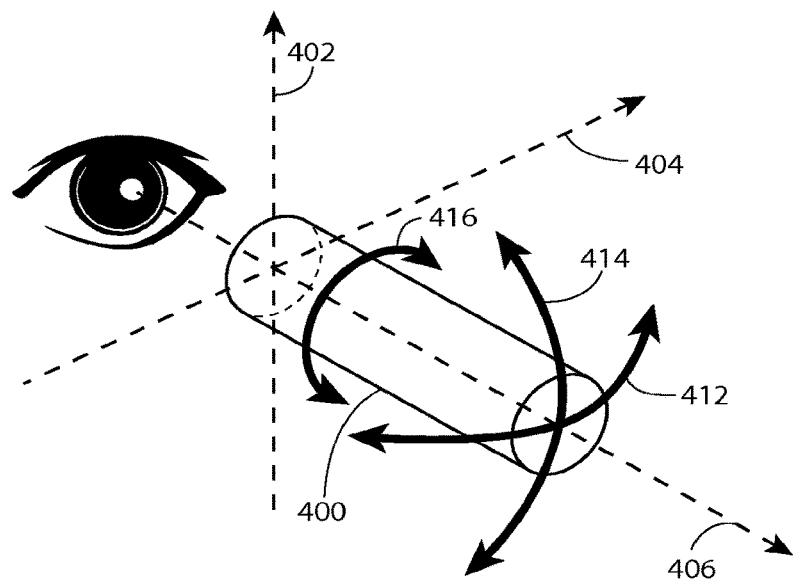
FIG. 4 is a diagram illustrating receipt of input according to at least one example embodiment.
FIG. 5 is a diagram illustrating determination of an operation according to at least one example embodiment.

FIG. 4 is a diagram illustrating receipt of input according to at least one example embodiment. The example of FIG. 4 is merely an example and does not limit the scope of the claims. For example, the type input may vary, the number of inputs may vary, the apparatus receiving the input may vary, and/or the like.

As previously described, an apparatus may receive information indicative of an input from one or more input sensors. In some circumstances, it may be desirable to receive information indicative of an apparatus movement input. For instance, a user of the apparatus may wish to interact with an apparatus with an input other than a touch input, interact with the apparatus with movement of the apparatus in conjunction with touch inputs, and/or the like. In this manner, the apparatus may be utilized similar to other devices the user may be familiar with, such as a monocular apparatus. For example, it may be intuitive for a user to scroll through a software screen controlled by the apparatus without having to utilize touch input by "tilting" the apparatus, identify objects for selection by "pointing" the apparatus at an object, and/or the like. In at least one example embodiment, information indicative of an input is indicative of an apparatus movement input.

FIG. 4 illustrates apparatus 400 in relation to vertical axis 402, lateral axis 404, and longitudinal axis 406. Apparatus 400 may be similar as described regarding FIG. 1, FIGS. 2A-2F, FIG. 3 and/or the like. FIG. 4 illustrates a rotational movement 412, a rotational movement 414, and a rotational movement 416. In the example of FIG. 4, rotational movement 412 is an example of a rotational movement with respect to vertical axis 402. In the example of FIG. 4, rotational movement 414 is an example of a rotational movement with respect to lateral axis 404. In the example of FIG. 4, rotational movement 416 is an example of a rotational movement with respect to longitudinal axis 406.

In some circumstances, an apparatus may be moved up and/or down with respect to the current position of the apparatus. For example, apparatus 400 of FIG. 4 may be moved up and/or down along vertical axis 402. Movement up and/or down may be referred to as a vertical movement. In at least one example embodiment, an apparatus movement input is indicative of a vertical movement. An apparatus movement input indicative of a vertical movement, for example, an upward movement, a downward movement, and/or the like, may be referred to as a vertical input.

In some circumstances, an apparatus may be moved left and/or right with respect to the current position of the apparatus. For example, apparatus 400 of FIG. 4 may be moved left and/or right along lateral axis 404. Movement left and/or right may be referred to as a lateral movement. In at least one example embodiment, an apparatus movement input is indicative of a lateral movement. An apparatus movement input indicative of a lateral movement, for example, a leftward movement, a rightward movement, and/or the like, may be referred to as a lateral input.

In some circumstances, an apparatus may be moved forward and/or backward with respect to the current position of the apparatus. For example, apparatus 400 of FIG. 4 may be moved forward and/or backward along longitudinal axis 406. Movement forward and/or backward may be referred to as a longitudinal movement. In at least one example embodiment, an apparatus movement input is indicative of a longitudinal movement. An apparatus movement input indicative of a longitudinal movement, for example, a forward movement, a backward movement, and/or the like, may be referred to as a longitudinal input.

In some circumstances, an apparatus may be rotated about a vertical axis with respect to the current position of the apparatus. For example, apparatus 400 of FIG. 4 may be rotated similar to rotation movement 412. Rotation about a vertical axis may be referred to as a yaw movement. In at least one example embodiment, an apparatus movement input is indicative of a yaw movement. An apparatus movement input indicative of a yaw movement, for example, a leftward yaw rotation, a rightward yaw rotation, and/or the like may be referred to as a pan input.

In some circumstances, an apparatus may be rotated about a lateral axis with respect to the current position of the apparatus. For example, apparatus 400 of FIG. 4 may be rotated similar to rotation movement 414. Rotation about a lateral axis may be referred to as a pitch movement. In at least one example embodiment, an apparatus movement input is indicative of a pitch movement. An apparatus movement input indicative of a pitch movement, for example, an upward pitch rotation, a downward pitch rotation, and/or the like, may be referred to as a tilt input.

In some circumstances, an apparatus may be rotated about a longitudinal axis with respect to the current position of the apparatus. For example, apparatus 400 of FIG. 4 may be rotated similar to rotation movement 416. Rotation about a longitudinal axis may be referred to as a roll movement. In at least one example embodiment, an apparatus movement input is indicative of a roll movement. An apparatus movement input indicative of a roll movement, for example a clockwise roll rotation, a counter-clockwise roll rotation, and/or the like may be referred to as a spin input.

In some circumstances, information indicative of an input may be indicative of more than one type of movement input. For example, a user may move an apparatus in multiple directions at once, may rotate the apparatus along more than one axis, may move the apparatus in one or more directions while rotating the apparatus along one or more axes, and/or the like. For instance, a user may move an apparatus upward and leftward, may tilt the apparatus downward while panning the apparatus rightward, may move the apparatus downward while tilting the apparatus upward, and/or the like.

FIG. 5 is a diagram illustrating determination of an operation according to at least one example embodiment. The example of FIG. 5 is merely an example and does not limit the scope of the claims. For example, the type operation may vary, the number of operations may vary, the apparatus determining the operation may vary, and/or the like.

In some circumstances, an apparatus may perform operations. For example, an apparatus may execute software routines, respond to input, control hardware, and/or the like. For instance, a user may be using the apparatus to perform a particular task, to run software, and or the like. In circumstances such as these, particular operations may be associated with the task, the software routine, and/or the like. In some circumstances, it may be desirable for an apparatus to determine an operation based, at least in part, on an input. For example, an apparatus may perform an operation based, at least in part, on a particular input from a user. In this manner, they apparatus may perform an operation based, at least in part, on a desire of the user, execute a particular software routine based, at least in part, on the environmental conditions of the apparatus, and/or the like.

As previously described, in some circumstances, an apparatus may enter a passive viewing state, an active viewing state, and/or the like. In circumstances such as these, it may be desirable to determine an operation based, at least in part, on the viewing state and an input. For instance, user may desire to interact with the apparatus in different manners based, at least in part, on whether the user is actively or passively viewing the apparatus, what information is being displayed by the apparatus, and/or the like. For example, for a user may enter a particular input, such as a tap input, to initiate different operations for different viewing states of the apparatus. For instance, a tap input may be entered to terminate display of a visual event notification when the apparatus has entered a passive viewing state, a tap input may be entered activate a software routine when the apparatus has entered an active viewing state, and/or the like. In another example, it may be desirable for an apparatus movement input to disable a lock mode during a passive viewing state, and cause device interaction during an active viewing state. Lock mode may refer to a mode of an apparatus that limits apparatus functionality. For example, the apparatus may not receive most input until a particular input is used to disable the lock mode, such as a particular gesture, a password, and/or the like. In circumstances such as these, it may be desirable for an apparatus to correlate an operation with a particular input and a particular viewing state.

FIG. 5 illustrates a table correlating various inputs with particular viewing states and operations. The table of FIG. 5 may comprise a data structure, a formatted table, a user readable list, and/or the like, that correlates a particular type of input a particular viewing state and a particular operation. A particular correlation may be retrieved from a repository, generated by a user profile, configured by a user of the apparatus, generated based, and/or the like. In the example of FIG. 5, tilt input 502 is correlated with active viewing state 512 and passive viewing state 532. Active viewing state 512 is correlated with operation 522. Passive viewing state 532 is correlated with operation 542. In the example of FIG. 5, rotation input 504 is correlated with active viewing state 514 and passive viewing state 534. Active viewing state 514 is correlated with operation 524. Passive viewing state 534 is correlated with operation 544. In the example of FIG. 5, pan input 506 is correlated with active viewing state 516 and passive viewing state 536. Active viewing state 516 is correlated with operation 526. Passive viewing state 536 is correlated with operation 546. Even though the example of FIG. 5 illustrates a tilt input, a rotation input, and a pan input, the table in the example of FIG. 5 may comprise correlations for any type of input, any number of inputs, and/or the like. For example, the table may correlate a tap input, a sideways input, a combination of inputs, and/or the like, with a particular viewing state, with a particular operation, and/or the like.

In at least one example embodiment, an apparatus determines an operation based, at least in part, on a passive viewing state and an input. For example, an apparatus may determine operation 542 of FIG. 5 based, at least in part, on receipt of a tilt input 502 after the apparatus has entered a passive viewing state 532. In this manner, the apparatus may perform operation 542 based, at least in part, on tilt input 502 and passive viewing state 532. For example, operation 542 may be a scrolling operation where visual information is scrolled at a reduced rate in proportion to a rate of scrolling of visual information in proportion to an identical input correlated to a different operation, such as operation 522. For instance, if a user is viewing photographs, operation 542 may scroll to a different position of a currently viewed photograph upon receipt of tilt input 502 during an active viewing state, whereas operation 522 may advance to a different photograph within a gallery upon receipt of tilt input 502 during a passive viewing state. In another example, if a user is reading text, operation 542 may scroll the text being read line by line upon receipt of tilt input 502 during an active viewing state, whereas operation 522 may scroll the text being read page by page upon receipt of tilt input 502 during a passive viewing state.

When an apparatus has entered a passive viewing state, it may be desirable for inputs to be based on passive types of operations a user may desire to cause performance of, the context of a user interacting with the apparatus while in a passive viewing state, software being utilized while in a passive viewing state, and/or the like. In at least one example embodiment, the passive viewing state is an operational state in which operations that correlate with inputs and the passive viewing state are tailored to an impaired-viewing display mode. In some circumstances, operations that correlate with inputs and the passive viewing state avoid interaction associated with information displayed in an unimpaired-viewing display mode. For example, operations that correlate with inputs and the passive viewing state may be limited to interaction associated with information displayed in an impaired-viewing display mode, omit causation of display of information in an unimpaired viewing display mode, provide limited user visual interaction associated with the impaired-viewing display mode, and/or the like.

In at least one example embodiment, an apparatus determines an operation based, at least in part, on an active viewing state and an input. For example, an apparatus may determine operation 522 of FIG. 5 based, at least in part, on receipt of tilt input 502 while the apparatus is in active viewing state 512. In this manner, the apparatus may perform operation 522 based, at least in part, on tilt input 502 and active viewing state 512. For example, operation 522 may be a scrolling operation where visual information is scrolled at an increased rate in proportion to a rate the scrolling of visual information in proportion to an identical input correlated to a different operation, such as operation 542. For instance, if a user is viewing photographs, operation 522 may advance to a different photograph within a gallery upon receipt of tilt input 502 during a passive viewing state, whereas operation 542 may scroll to a different position of a currently viewed photograph upon receipt of tilt input 502 during an active viewing state. In another example, if a user is reading text, operation 522 may scroll the text being read page by page upon receipt of tilt input 502 during a passive viewing state, whereas operation 542 may scroll the text being read line by line upon receipt of tilt input 502 during an active viewing state.

When an apparatus has entered an active viewing state, it may be desirable for inputs to be based on active types of operations a user may desire to cause performance of, the context of a user interacting with the apparatus while in an active viewing state, software being utilized while in an active viewing state, and/or the like. In at least one example embodiment, the active viewing state is an operational state in which operations that correlate with inputs and the active viewing state are tailored to the unimpaired-viewing display mode. In some circumstances, operations that correlate with inputs and the active viewing state avoid limited user visual interaction associated with the impaired-viewing display mode. For example, operations that correlate with inputs and the active viewing state may comprise interaction associated with information displayed in an unimpaired-viewing display mode, may cause display of information in an unimpaired-viewing display mode, may provide interaction associated with information displayed in an unimpaired-viewing display mode, and/or the like.

In some circumstances, it may be desirable for an apparatus to preclude performance of an operation based, at least in part, on the passive viewing state and an input For instance, the apparatus may be hanging from a necklace worn by the user, placed in the user's pocket, sitting on a desk, and/or the like. In circumstances such as these, the apparatus may be inadvertently touched, moved, and/or the like. In circumstances where the apparatus is in a passive viewing state, precluding performance of operations may limit undesired operation of the apparatus based, at least in part, on unintended input. For example, when they apparatus is in a passive state, certain movement inputs may be undesirable, a particular operation may not be correlated with a particular input and the passive state, and/or the like. In at least one example embodiment, preclusion of performance of the operation comprises determination of absence of an operation that correlates with the passive viewing state and an input. For example, the apparatus may receive an unintentional tap input while the apparatus is placed within a pocket, and the apparatus may preclude dismissal of a notification based, at least in part, on the unintentional tap input.

Figure 6:
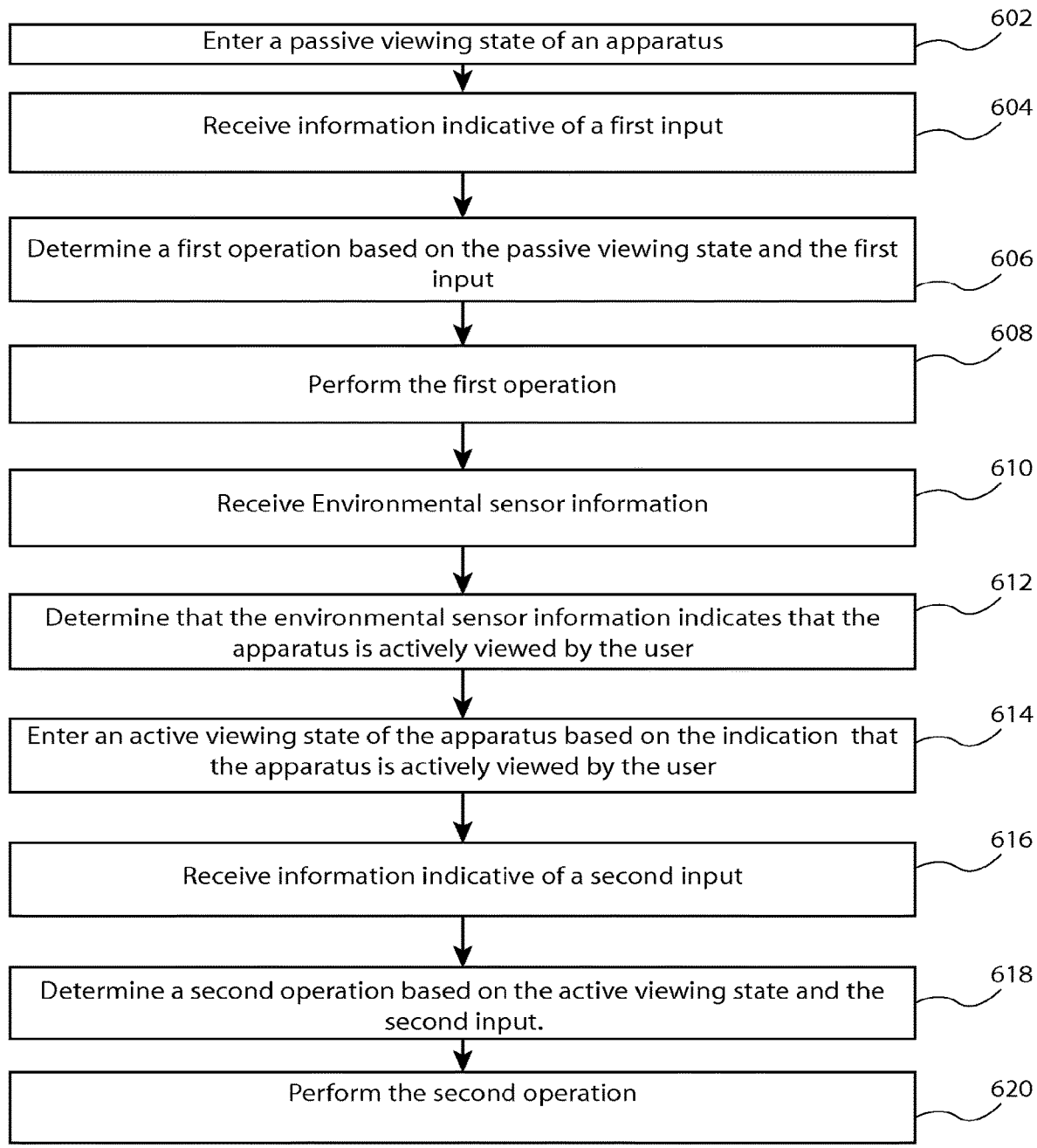
FIG. 6 is a flow diagram illustrating activities associated with determination of an operation according to at least one example embodiment.

FIG. 6 is a flow diagram illustrating activities associated with determination of an operation according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

At block 602, the apparatus enters a passive viewing state of the apparatus. The apparatus, the entering, and the passive viewing state may be similar as described regarding FIG. 1, FIGS. 2A-2F, and FIGS. 3A-3C.

At block 604, the apparatus receives information indicative of a first input. The receipt and the input may be similar as described regarding FIGS. 3A-3C, FIG. 4, and FIG. 5.

At block 606, the apparatus determines a first operation based, at least in part, on the passive viewing state and the first input. The determination and the operation may be similar as described regarding FIG. 5.

At block 608, the apparatus performs the first operation. The performance may be similar as described regarding FIG. 5.

At block 610, the apparatus receives environmental sensor information. The receipt and the environmental sensor information may be similar as described regarding FIGS. 2A-2F.

At block 612, the apparatus determines that the environmental sensor information indicates that the apparatus is actively viewed by a user. The determination and the indication may be similar as described regarding FIGS. 2A-2F.

At block 614, the apparatus enters an active viewing state of the apparatus based, at least in part, on the determination that the environmental sensor information indicates that the apparatus is actively viewed by the user. The entering and the active viewing state may be similar as described regarding FIGS. 2A-2F.

At block 616, the apparatus receives information indicative of a second input. The second input may be substantially the same as the first input. The receipt and the input may be similar as described regarding FIGS. 3A-3C, FIG. 4, and FIG. 5.

At block 618, the apparatus determines a second operation based, at least in part, on the active viewing state and the second input. The second operation may be different from the first operation. The determination and the operation may be similar as described regarding FIG. 5.

At block 620, the apparatus performs the second operation. The performance may be similar as described regarding FIG. 5.

Figure 7:
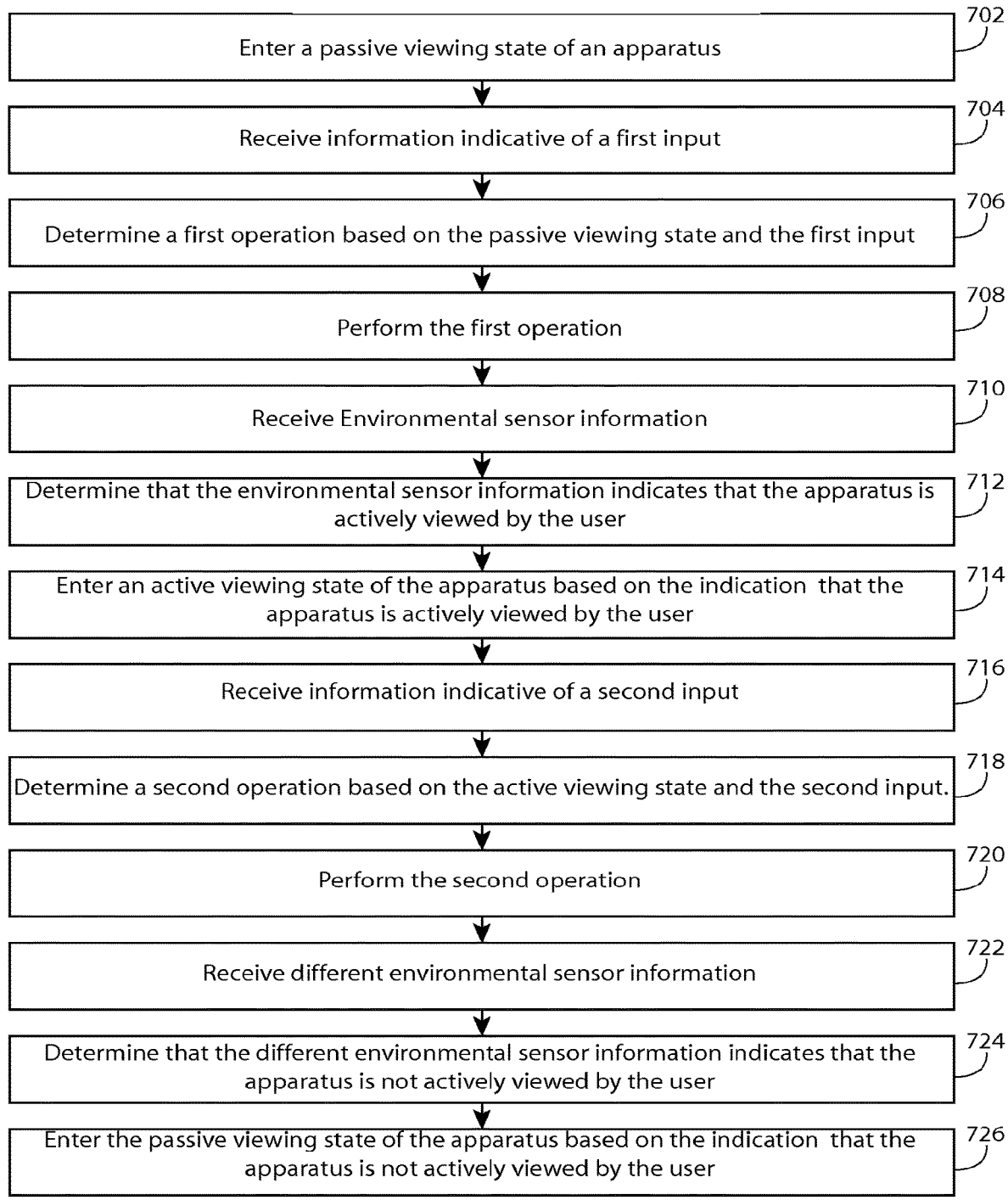
FIG. 7 is a flow diagram illustrating activities associated with entering of a passive viewing state according to at least one example embodiment.

FIG. 7 is a flow diagram illustrating activities associated with entering of a passive viewing state according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

As previously described, in some circumstances an apparatus may enter a passive viewing state based, at least in part, on an indication that the apparatus is not actively viewed by the user.

At block 702, the apparatus enters a passive viewing state of the apparatus, similarly as described regarding block 602 of FIG. 6. At block 704, the apparatus receives information indicative of a first input, similarly as described regarding block 604 of FIG. 6. At block 706, the apparatus determines a first operation based, at least in part, on the passive viewing state and the first input, similarly as described regarding block 606 of FIG. 6. At block 708, the apparatus performs the first operation, similarly as described regarding block 608 of FIG. 6. At block 710, the apparatus receives environmental sensor information, similarly as described regarding block 610 of FIG. 6. At block 712, the apparatus determines that the environmental sensor information indicates that the apparatus is actively viewed by a user, similarly as described regarding block 612 of FIG. 6. At block 714, the apparatus enters an active viewing state of the apparatus based, at least in part, on the determination that the environmental sensor information indicates that the apparatus is actively viewed by the user, similarly as described regarding block 614 of FIG. 6. At block 716, the apparatus receives information indicative of a second input. The second input may be substantially the same as the first input, similarly as described regarding block 616 of FIG. 6. At block 718, the apparatus determines a second operation based, at least in part, on the active viewing state and the second input, similarly as described regarding block 618 of FIG. 6. At block 720, the apparatus performs the second operation, similarly as described regarding block 620 of FIG. 6.

At block 722, the apparatus receives different environmental sensor information. The receipt and the environmental sensor information may be similar as described regarding FIGS. 2A-2F.

At block 724, the apparatus determines that the different environmental sensor information indicates that the apparatus is not actively viewed by the user. The determination and the indication may be similar as described regarding FIGS. 2A-2F.

At block 726, the apparatus enters the passive viewing state of the apparatus based, at least in part, on the determination that the different environmental sensor information indicates that the apparatus is not actively viewed by the user. The entering may be similar as described regarding FIGS. 2A-2F.

Figure 8:
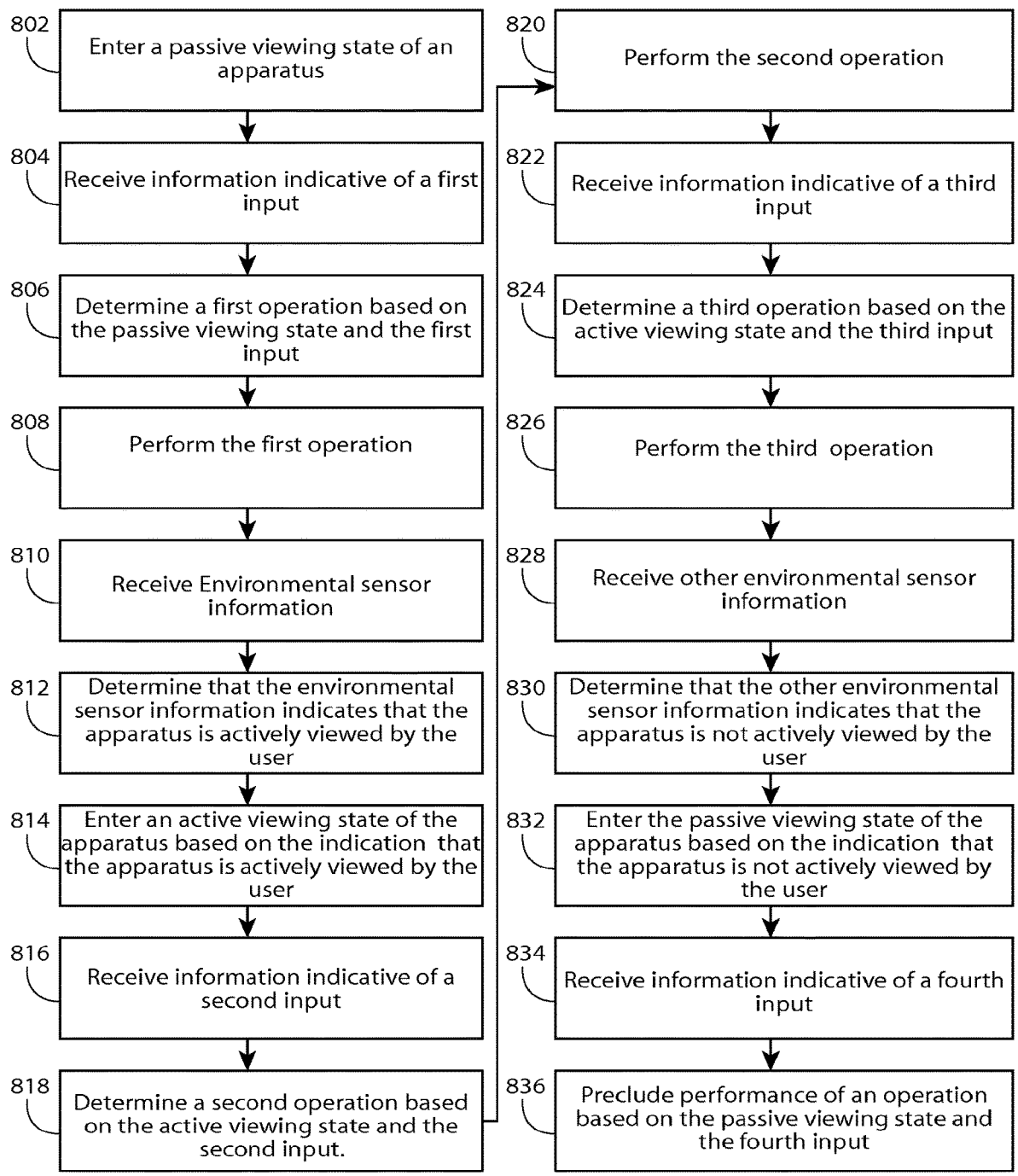
FIG. 8 is a flow diagram illustrating activities associated with preclusion of performance an operation according to at least one example embodiment.

FIG. 8 is a flow diagram illustrating activities associated with preclusion of performance an operation according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As previously described, in some circumstances, it may be desirable to preclude performance of an operation based, at least in part, on a passive viewing state of the apparatus.

At block 802, the apparatus enters a passive viewing state of the apparatus, similarly as described regarding block 602 of FIG. 6. At block 804, the apparatus receives information indicative of a first input, similarly as described regarding block 604 of FIG. 6. At block 806, the apparatus determines a first operation based, at least in part, on the passive viewing state and the first input, similarly as described regarding block 606 of FIG. 6. At block 808, the apparatus performs the first operation, similarly as described regarding block 608 of FIG. 6. At block 810, the apparatus receives environmental sensor information, similarly as described regarding block 610 of FIG. 6. At block 812, the apparatus determines that the environmental sensor information indicates that the apparatus is actively viewed by a user, similarly as described regarding block 612 of FIG. 6. At block 814, the apparatus enters an active viewing state of the apparatus based, at least in part, on the determination that the environmental sensor information indicates that the apparatus is actively viewed by the user, similarly as described regarding block 614 of FIG. 6. At block 816, the apparatus receives information indicative of a second input. The second input may be substantially the same as the first input, similarly as described regarding block 616 of FIG. 6. At block 818, the apparatus determines a second operation based, at least in part, on the active viewing state and the second input, similarly as described regarding block 618 of FIG. 6. At block 820, the apparatus performs the second operation, similarly as described regarding block 620 of FIG. 6.

At block 822, the apparatus receives information indicative of a third input. The third input may be substantially the same as the first input and/or the second input. The receipt and the input may be similar as described regarding FIGS. 3A-3C, FIG. 4, and FIG. 5.

At block 824, the apparatus determines a third operation based, at least in part, on the active viewing state and the third input. The third operation may be different from the first operation and/or the second operation. The determination and the operation may be similar as described regarding FIG. 5.

At block 826, the apparatus performs the third operation. The performance may be similar as described regarding FIG. 5.

At block 828, the apparatus receives other environmental sensor information. The receipt and the environmental sensor information may be similar as described regarding FIGS. 2A-2F.

At block 830, the apparatus determines that the other environmental sensor information indicates that the apparatus is not actively viewed by the user. The determination and the indication may be similar as described regarding FIGS. 2A-2F.

At block 832, the apparatus enters the passive viewing state of the apparatus based, at least in part, on the determination that the other environmental sensor information indicates that the apparatus is not actively viewed by the user. The entering may be similar as described regarding FIGS. 2A-2F.

At block 834, the apparatus receives information indicative of a fourth input. The fourth input may be substantially the same as the third input. The receipt and the input may be similar as described regarding FIGS. 3A-3C, FIG. 4, and FIG. 5.

At block 836, the apparatus precludes performance of an operation based, at least in part, on the passive viewing state and the fourth input. The preclusion of performance may be similar as described regarding FIG. 5.

Embodiments of the invention may be implemented in software, hardware, application logic or a combination of software, hardware, and application logic. The software, application logic, and/or hardware may reside on the apparatus, a separate device, or a plurality of separate devices. If desired, part of the software, application logic, and/or hardware may reside on the apparatus, part of the software, application logic and/or hardware may reside on a separate device, and part of the software, application logic, and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 602 of FIG. 6 may be performed after block 604 of FIG. 6. Furthermore, if desired, one or more of the above-described functions may be optional or may be combined. For example, block 602 of FIG. 6 may be optional and/or combined with block 604 of FIG. 6.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

That which is claimed is:

1. An apparatus, comprising:
   a near eye display;
   at least one processor; and
   at least one memory including computer program code, the memory and the computer program code configured to, working with the processor, cause the apparatus to perform at least the following:
   entering of a passive viewing state of the apparatus;
   receipt of information indicative of a first input;
   determination of a first operation based, at least in part, on the passive viewing state and the first input;
   performance of the first operation;
   receipt of environmental sensor information indicating proximity of a user to the near eye display;
   determination that the environmental sensor information indicates that the apparatus is actively viewed by the user;
   entering of an active viewing state of the apparatus based, at least in part, on the determination that the environmental sensor information indicates that the apparatus is actively viewed by the user;
   receipt of information indicative of a second input, the second input being substantially the same as the first input;
   determination of a second operation based, at least in part, on the active viewing state and the second input, the second operation being different from the first operation; and
   performance of the second operation.

2. The apparatus of claim 1, wherein the memory includes computer program code configured to, working with the processor, cause the apparatus to perform:
   receipt of different environmental sensor information;
   determination that the different environmental sensor information indicates that the apparatus is not actively viewed by the user; and
   entering of the passive viewing state of the apparatus based, at least in part, on the determination that the different environmental sensor information indicates that the apparatus is not actively viewed by the user.

3. The apparatus of claim 2, wherein the different environmental sensor information indicates that the user is distant from the near eye display.

4. The apparatus of claim 1, wherein the memory includes computer program code configured to, working with the processor, cause the apparatus to perform:
   receipt of information indicative of a third input;
   determination of a third operation based, at least in part, on the active viewing state and the third input;
   performance of the third operation;
   receipt of other environmental sensor information;
   determination that the other environmental sensor information indicates that the apparatus is not actively viewed by the user;
   entering of the passive viewing state of the apparatus based, at least in part, on the determination that the other environmental sensor information indicates that the apparatus is not actively viewed by the user;
   receipt of information indicative of a fourth input, the fourth input being substantially the same as the third input; and
   preclusion of performance of an operation based, at least in part, on the passive viewing state and the fourth input.

5. The apparatus of claim 1, wherein the determination of the first operation comprises determination that the first operation correlates with the first input and the passive viewing state.

6. The apparatus of claim 1, wherein the determination of the second operation comprises determination that the second operation correlates with the second input and the active viewing state.

7. The apparatus of claim 1, wherein the operations that correlate with inputs and the passive viewing state avoid interaction associated with information displayed in an unimpaired-viewing display mode.

8. The apparatus of claim 1, wherein the operations that correlate with inputs and the active viewing state avoid limited user visual interaction associated with an impaired-viewing display mode.

9. The apparatus of claim 1, wherein the first input is a tilt input and the second input is a tilt input.

10. A method comprising:
    entering a passive viewing state of an apparatus;
    receiving information indicative of a first input;
    determining of a first operation based, at least in part, on the passive viewing state and the first input;
    performing the first operation;
    receiving environmental sensor information indicating proximity of a user to a near eye display of the apparatus;

determining that the environmental sensor information indicates that the apparatus is actively viewed by the user;

entering an active viewing state of the apparatus based, at least in part, on the determination that the environmental sensor information indicates that the apparatus is actively viewed by the user;

receiving information indicative of a second input, the second input being substantially the same as the first input;

determining a second operation based, at least in part, on the active viewing state and the second input, the second operation being different from the first operation; and performing the second operation.

11. The method of claim 10, further comprising:

receiving different environmental sensor information;

determining that the different environmental sensor information indicates that the apparatus is not actively viewed by the user; and entering the passive viewing state of the apparatus based, at least in part, on the determination that the different environmental sensor information indicates that the apparatus is not actively viewed by the user.

12. The method of claim 11, wherein the different environmental sensor information indicates that the user is distant from the near eye display.

13. The method of claim 10, further comprising:

receiving information indicative of a third input;

determining a third operation based, at least in part, on the active viewing state and the third input;

performing the third operation;

receiving other environmental sensor information;

determining that the other environmental sensor information indicates that the apparatus is not actively viewed by the user;

entering the passive viewing state of the apparatus based, at least in part, on the determination that the other environmental sensor information indicates that the apparatus is not actively viewed by the user;

receiving information indicative of a fourth input, the fourth input being substantially the same as the third input; and precluding performance of an operation based, at least in part, on the passive viewing state and the fourth input.

14. The method of claim 10, wherein the determination of the first operation comprises determination that the first operation correlates with the first input and the passive viewing state.

15. The method of claim 10, wherein the determination of the second operation comprises determination that the second operation correlates with the second input and the active viewing state.

16. The method of claim 10, wherein the operations that correlate with inputs and the passive viewing state avoid interaction associated with information displayed in an unimpaired-viewing display mode.

17. The method of claim 10, wherein the operations that correlate with inputs and the active viewing state avoid limited user visual interaction associated with an impaired-viewing display mode.

18. At least one non-transitory computer-readable medium encoded with instructions that, when executed by a processor, perform:

entering of a passive viewing state of an apparatus;

receipt of information indicative of a first input;

determination of a first operation based, at least in part, on the passive viewing state and the first input;

performance of the first operation;

receipt of environmental sensor information indicating proximity of a user to a near eye display of the apparatus;

determination that the environmental sensor information indicates that the apparatus is actively viewed by the user;

entering of an active viewing state of the apparatus based, at least in part, on the determination that the environmental sensor information indicates that the apparatus is actively viewed by the user;

receipt of information indicative of a second input, the second input being substantially the same as the first input;

determination of a second operation based, at least in part, on the active viewing state and the second input, the second operation being different from the first operation; and performance of the second operation.

19. The medium of claim 18, further encoded with instructions that, when executed by a processor, perform:

receipt of different environmental sensor information;

determination that the different environmental sensor information indicates that the apparatus is not actively viewed by the user; and entering of the passive viewing state of the apparatus based, at least in part, on the determination that the different environmental sensor information indicates that the apparatus is not actively viewed by the user.

20. The medium of claim 18, wherein the different environmental sensor information indicates that the user is distant from the near eye display.

* * * * *